(12) United States Patent
Chunchu et al.

(10) Patent No.: US 12,210,519 B2
(45) Date of Patent: Jan. 28, 2025

(54) METHOD AND SYSTEM FOR PROVIDING A VIRTUAL ASSISTANT FOR TECHNICAL SUPPORT

(71) Applicant: JPMorgan Chase Bank, N.A., New York, NY (US)

(72) Inventors: Parankush Chunchu, Hyderabad (IN); Shubhrangam Malaviya, Noida (IN); Samdeep Nayak, Bangalore (IN)

(73) Assignee: JPMORGAN CHASE BANK, N.A., New York, NY (US)

(*) Notice: Subject to any disclaimer, the term of this patent is extended or adjusted under 35 U.S.C. 154(b) by 0 days.

(21) Appl. No.: 18/215,513

(22) Filed: Jun. 28, 2023

(65) Prior Publication Data

US 2024/0386014 A1  Nov. 21, 2024

(30) Foreign Application Priority Data

May 15, 2023  (IN) ............................. 202311034088

(51) Int. Cl.
| | | |
|---|---|---|
| G06F 7/00 | (2006.01) | |
| G06F 16/242 | (2019.01) | |
| G06F 16/2457 | (2019.01) | |
| G06F 16/248 | (2019.01) | |

(52) U.S. Cl.
CPC ...... *G06F 16/243* (2019.01); *G06F 16/24578* (2019.01); *G06F 16/248* (2019.01)

(58) Field of Classification Search
CPC ............. G06F 16/243; G06F 16/24578; G06F 16/248; G06F 16/2465; G06F 16/3344; G06F 16/338; G06F 16/9038; G06F 16/9535; G06F 16/90332; G06F 16/86; G06F 16/29; G06F 40/35; G06F 40/30; G06F 40/216; G06F 40/268; G06F 40/279; G06F 40/247
See application file for complete search history.

(56) References Cited

U.S. PATENT DOCUMENTS

| | | | |
|---|---|---|---|
| 11,803,556 B1* | 10/2023 | Samdani | G06F 16/24578 |
| 2021/0144108 A1* | 5/2021 | Sait M A | G06F 16/9038 |
| 2023/0281194 A1* | 9/2023 | Lezcano | G06F 16/2425 707/759 |
| 2023/0316145 A1* | 10/2023 | Poomari | G06N 3/0442 706/12 |

* cited by examiner

*Primary Examiner* — Mohammad A Sana
(74) *Attorney, Agent, or Firm* — GREENBLUM & BERNSTEIN, P.L.C.

(57) ABSTRACT

A method and a system for providing a natural language processing based virtual assistant for a technical support are disclosed. The method includes receiving at least one query from at least one entity. Next, the method includes analyzing the at least one query. Next, the method includes retrieving, from a database, a plurality of queries along with a corresponding resolution based on the analysis of the at least one query. Next, the method includes displaying, via a display, the plurality of queries along with the corresponding resolution to the at least one entity. Thereafter, the method includes receiving feedback on the plurality of queries displayed to the at least one entity along with the corresponding resolution.

12 Claims, 5 Drawing Sheets

METHOD AND SYSTEM FOR PROVIDING A VIRTUAL ASSISTANT FOR TECHNICAL SUPPORT

CROSS-REFERENCE TO RELATED APPLICATIONS

This application claims priority benefit from Indian application No. 202311034088, filed May 15, 2023 in the India Patent Office, which is hereby incorporated by reference in its entirety.

BACKGROUND

Field of the Disclosure

This technology generally relates to methods and systems for providing a virtual assistant, and more particularly to methods and systems for providing a natural language processing (NLP) based virtual assistant for technical support.

Related Art

The following description of the related art is intended to provide background information pertaining to the field of the present disclosure. This section may include certain aspects of the art that may be related to various features of the present disclosure. However, it should be appreciated that this section is used only to enhance the understanding of the reader with respect to the present disclosure, and not as admission of the prior art.

As is generally known, organizations strive to provide technical support to their employees. The incidents or queries raised by the employees are repetitive due to the similar nature of the day-to-day tasks performed in any organization. The incidents and queries of the employees are handled by the technical support team and the time taken by the technical support team to manually resolve such queries causes delays and impacts productivity.

The major drawback in the conventional process of resolving queries and providing technical support is associated with an inability of the support team to leverage from the identical and similar queries resolved in the past. Further, classifying queries to ensure handling by the appropriate support team and receiving additional context on the query increases the time consumed in the resolution of the query and providing technical support.

Hence, in view of these and other existing limitations, there arises an imperative need to provide an efficient solution to overcome the above-mentioned limitations and to provide a method and system for providing a virtual assistant for technical support.

SUMMARY

The present disclosure, through one or more of its various aspects, embodiments, and/or specific features or sub-components, provides, inter alia, various systems, servers, devices, methods, media, programs, and platforms for providing a virtual assistant for technical support.

According to an aspect of the present disclosure, a method for providing a natural language processing-based virtual assistant for technical support is disclosed. The method is implemented by at least one processor. The method includes receiving, by the at least one processor via a communication interface, at least one query from at least one entity. Next, the method includes analyzing, by the at least one processor using a trained model, the at least one query. Next, the method includes retrieving, by the at least one processor from a database, a plurality of queries along with a corresponding resolution based on the analysis of the at least one query. Next, the method includes displaying, by the at least one processor via a display, the plurality of queries along with the corresponding resolution to the at least one entity. Thereafter, the method includes receiving, by the at least one processor via the communication interface, feedback on the plurality of queries displayed to the at least one entity along with the corresponding resolution.

In accordance with an exemplary embodiment, the at least one query corresponds to at least one from among a text-based query, an audio-based query, and a screenshot-based query.

In accordance with an exemplary embodiment, the analyzing the at least one query includes interpreting, by the at least one processor, a context associated with the at least one query; and identifying, by the at least one processor, a root cause associated with the at least one query.

In accordance with an exemplary embodiment, the database includes data associated with the corresponding resolution of the plurality of queries, and the feedback received, from the at least one entity, on the plurality of queries displayed along with the corresponding resolution.

In accordance with an exemplary embodiment, the retrieving the plurality of queries and the corresponding resolution from the database includes identifying, by the least one processor, the plurality of queries and the corresponding resolution from the database, wherein the plurality of queries is identified based on a matching of parameters of the at least one query with parameters of the plurality of queries; ranking, by the at least one processor, each respective query of the plurality of queries using the trained model; and recommending, by the at least one processor, the plurality of queries along with the corresponding resolution to the at least one entity based on the ranking of each respective query of the plurality of queries.

According to another aspect of the present disclosure, a computing device configured to implement an execution of a method for providing a natural language processing-based virtual assistant for technical support is disclosed. The computing device includes a processor; a memory; and a communication interface coupled to each of the processor and the memory. The processor may be configured to receive, via the communication interface, at least one query from at least one entity; analyze, using a trained model, the at least one query; retrieve, from a database, a plurality of queries along with a corresponding resolution based on the analysis of the at least one query; display the plurality of queries along with corresponding resolution to the at least one entity; and receive, via the communication interface, feedback on the plurality of queries displayed to the at least one entity along with the corresponding resolution.

In accordance with an exemplary embodiment, the at least one query corresponds to at least one from among a text-based query, an audio-based query, and a screenshot-based query.

In accordance with an exemplary embodiment, to analyze the at least one query, the processor may be further configured to interpret a context associated with the at least one query; and identify a root cause associated with the at least one query.

In accordance with an exemplary embodiment, the database includes data associated with the corresponding resolution of the plurality of queries, and the feedback received, from the at least one entity, on the plurality of queries displayed along with the corresponding resolution.

In accordance with an exemplary embodiment, to retrieve the plurality of queries and the corresponding resolution from the database, the processor is further configured to identify the plurality of queries and the corresponding resolution from the database, wherein the plurality of queries is identified based on a matching of parameters of the at least one query with parameters of the plurality of queries; rank each respective query of the plurality of queries using the trained model; and recommend the plurality of queries along with the corresponding resolution to the at least one entity based on the rank of each respective query of the plurality of queries.

According to yet another aspect of the present disclosure, a non-transitory computer-readable storage medium storing instructions for providing a natural language processing-based virtual assistant for technical support is disclosed. The instructions include executable code which, when executed by a processor, may cause the processor to receive, via a communication interface, at least one query from at least one entity; analyze, using a trained model, the at least one query; retrieve, from a database, a plurality of queries along with a corresponding resolution based on the analysis of the at least one query; display the plurality of queries along with the corresponding resolution to the at least one entity; and receive, via the communication interface, feedback on the plurality of queries displayed to the at least one entity along with the corresponding resolution.

In accordance with an exemplary embodiment, the at least one query corresponds to at least one from among a text-based query, an audio-based query, and a screenshot-based query.

In accordance with an exemplary embodiment, to analyze the at least one query, the executable code, when executed, further causes the processor to interpret a context associated with the at least one query; and identify a root cause associated with the at least one query.

In accordance with an exemplary embodiment, the database includes data associated with the corresponding resolution of the plurality of queries, and the feedback received, from the at least one entity, on the plurality of queries displayed along with the corresponding resolution.

In accordance with an exemplary embodiment, to retrieve the plurality of queries and the corresponding resolution from the database, the executable code, when executed, further causes the processor to identify the plurality of queries and the corresponding resolution from the database, wherein the plurality of queries is identified based on a matching of parameters of the at least one query with parameters of the plurality of queries; rank each respective query of the plurality of queries using the trained model; and recommend the plurality of queries along with the corresponding resolution to the at least one entity based on the rank of each respective query of the plurality of queries.

BRIEF DESCRIPTION OF THE DRAWINGS

The present disclosure is further described in the detailed description which follows, in reference to the noted plurality of drawings, by way of non-limiting examples of exemplary embodiments of the present disclosure, in which like characters represent like elements throughout the several views of the drawings.

DETAILED DESCRIPTION

Figure 1:
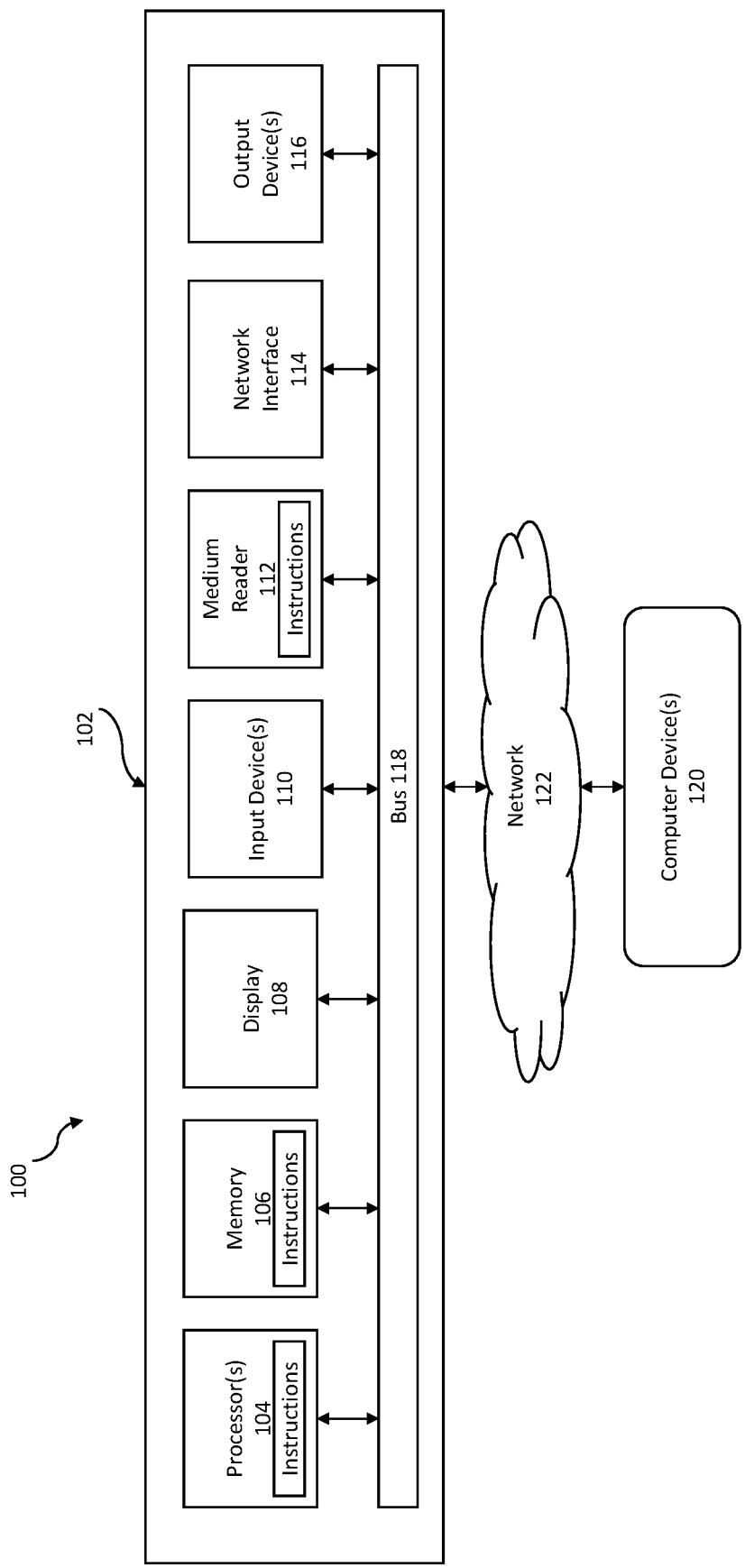
FIG. 1 illustrates an exemplary computer system for providing an NLP-based virtual assistant for technical support, in accordance with an exemplary embodiment.

Exemplary embodiments now will be described with reference to the accompanying drawings. The invention may, however, be embodied in many different forms and should not be construed as limited to the embodiments set forth herein; rather, these embodiments are provided so that this invention will be thorough and complete, and will fully convey its scope to those skilled in the art. The terminology used in the detailed description of the particular exemplary embodiments illustrated in the accompanying drawings is not intended to be limiting. In the drawings, like numbers refer to like elements.

The specification may refer to "an", "one" or "some" embodiment(s) in several locations. This does not necessarily imply that each such reference is to the same embodiment(s), or that the feature only applies to a single embodiment. Single features of different embodiments may also be combined to enable other embodiments.

As used herein, the singular forms "a", "an" and "the" are intended to include the plural forms as well, unless expressly stated otherwise. It will be further understood that the terms "include", "comprises", "including" and/or "comprising" when used in this specification, specify the presence of stated features, integers, steps, operations, elements, and/or components, but do not preclude the presence or addition of one or more other features, integers, steps, operations, elements, components, and/or groups thereof. It will be understood that when an element is referred to as being "connected" or "coupled" to another element, it can be directly connected or coupled to the other element or intervening elements may be present. Furthermore, "connected" or "coupled" as used herein may include wirelessly connected or coupled. As used herein, the term "and/or" includes any and all combinations and arrangements of one or more of the associated listed items. Also, as used herein, the phrase "at least one" means and includes "one or more" and such phrases or terms can be used interchangeably.

Unless otherwise defined, all terms (including technical and scientific terms) used herein have the same meaning as commonly understood by one of ordinary skill in the art to which this invention pertains. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

The figures depict a simplified structure only showing some elements and functional entities, all being logical units whose implementation may differ from what is shown. The connections shown are logical connections; the actual physical connections may be different.

In addition, all logical units and/or controllers described and depicted in the figures include the software and/or hardware components required for the unit to function. Further, each unit may comprise within itself one or more components, which are implicitly understood. These components may be operatively coupled to each other and be configured to communicate with each other to perform the function of the said unit.

In the following description, for the purposes of explanation, numerous specific details have been set forth in order to enable a description of the invention. It will be apparent, however, that the invention may be practiced without these specific details and features.

Through one or more of its various aspects, embodiments and/or specific features or sub-components of the present disclosure, are intended to bring out one or more of the advantages as specifically described above and noted below.

The examples may also be embodied as one or more non-transitory computer-readable storage media having instructions stored thereon for one or more aspects of the present technology as described and illustrated by way of the examples herein. The instructions in some examples include executable code that, when executed by one or more processors, causes the processors to carry out steps necessary to implement the methods of the examples of this technology that are described and illustrated herein.

To overcome the problems associated with the delayed resolution of queries raised by the employees/users for technical support, the present disclosure provides a method and system for providing an NLP based virtual assistant for the technical support. In a non-limiting embodiment, the NLP-based virtual assistant is based on a machine learning (ML) model that provides the NLP and Natural Language Understanding (NLU) capabilities to the virtual assistant. The system first receives the at least one query from at least one entity. In a non-limiting embodiment, the at least one query may correspond to at least one from among a text-based query, an audio-based query, and a screenshot-based query. In an example, the at least one entity may include but is not limited to a user, an employee, a member of the developer team, a member of the production support team, an automated query handling platform, and the like. The query may be received in the form of the text, the audio command, and the screenshot of the technical issue faced by the at least one entity. In an example, the system extracts the text of the query and the context of the query from the received screenshot. The capability to handle multiple input formats of queries increases the accessibility of technical support. In an example, the at least one query is received from the user for requesting technical support on Application A.

Next, the system analyzes the at least one query using a trained model. Further, the analysis of the at least one query involves interpreting a context associated with the at least one query and identifying a root cause associated with the at least one query. The identification of the root cause of the at least one query is enabled by the trained model. In an example, the at least one query received from the at least one entity related to Application A is analyzed and the context along with the root cause of the at least one query is identified by the virtual assistant.

In an exemplary embodiment, the trained model includes an Artificial Intelligence (AI) model. The trained model is subjected to supervised learning using data received from various applications and documents in the organization. The data helps the model to train and then identify the context of the at least one query. The trained model further undergoes training when handling the at least one query received from the at least one entity. The trained model uses various ML algorithms, including but not limited to, Sentence Bidirectional Encoder Representations from Transformers (SBERT), Semantic Textual Similarity (STS), and the like. In an example, the phrase "how old are you" and" what is your age" are semantically similar and the trained model is capable of identifying queries with similar context using the ML algorithms. The STS algorithm enables the identification of the context of the at least one query and other similar queries resolved in the past by the technical support team and the trained model. In a non-limiting embodiment, the system includes a database that is configured to store the plurality of queries and the corresponding resolution of the queries. In another non-limiting embodiment, the database may also store the associated context along with parameters of the at least one query identified using the model trained on the ML algorithms SBERT, STS, and the like. The parameters associated with the plurality of queries include but are not limited to the root cause of the query, the content of the query, the context of the query, the associated resolution of the query, the response and feedback of the at least one entity to the recommended resolution to similar queries raised in the past, and the like.

Next, the system retrieves the plurality of queries along with the corresponding resolution from the database based on the analysis of the at least one query. Further, the process of retrieving the plurality of queries involves the identification of the plurality of queries and the corresponding resolution from the database based on the analysis of the at least one query. More particularly, the plurality of queries is identified based on a matching of parameters of the at least one query with parameters of the plurality of queries stored in the database. The identified plurality of queries is then ranked using the trained model. Further, the at least one entity is recommended with the plurality of queries along with the corresponding resolution based on the ranking of each query of the plurality of queries. In an example, the five most relevant queries and the corresponding resolutions are retrieved from the database that matches the context and the root cause of the at least one query. The identified plurality of queries and the corresponding resolutions are ranked and recommended to the at least one entity for a quick resolution of the at least one query.

In an example, the identified plurality of queries with matching parameters is ranked as per their relevance to the context and root cause of the at least one query received from the at least one entity. The most relevant query with the highest matching of the parameters is ranked at the top in the list of the plurality of identified queries. The trained model uses the STS algorithm and other similar algorithms to rank the resolved relevant plurality of queries. In another non-limiting example, the parameters of the at least one query include but are not limited to the root cause of the query, the context of the query, and the content of the query matched with the plurality of queries stored in the database.

Thereafter, the system displays the identified plurality of queries along with the corresponding resolution to the at least one entity in the ranked format. In an example, the five most relevant resolutions are displayed to the at least one entity based on the analysis of the at least one query received from the at least one entity. The recommendation of the plurality of queries along with their corresponding resolutions is displayed to the at least one entity in sequential order as per the relevance and rank of each query of the plurality of queries. The system is further configured to receive feedback on the displayed plurality of queries and resolutions from the at least one entity. The feedback is recorded each time a resolution is displayed to the at least one entity. In another non-limiting embodiment, the system records the response of the at least one entity to the recommended resolution provided for the at least one query and the rank assigned to a plurality of recommended resolutions. The feedback received from the at least one entity is then used to train and improve the recommendation for the resolution of the at least one query in the future.

In an example, a screenshot of a query is received from a user or employee of the organization for the technical support. In general, understanding the query, and identification of the context and root cause of the query is time-consuming and unreliable. Additional time is required in identifying the most suitable resolution to the query. Thus, the conventional process is cumbersome and not recommended. Therefore, as per the solution of the present disclosure, the system is configured to analyze the at least one query by extracting the relevant parameters from the at least one query such as extracting content, and a context from a screenshot-based query. The NLP-based trained model handles the at least one query and matches the parameters of the at least one query with the previously handled and resolved queries to identify, rank, and recommend the matching queries along with the associated resolution to the at least one entity.

Therefore, the present disclosure aids in the faster and more reliable resolution of the at least one query received from the at least one entity such as employees of the organization. The at least one query received from the at least one entity is handled by the virtual assistant and the resolution to the at least one query is provided in real-time. The repetitive queries are handled efficiently using the features of the present disclosure. The context of the at least one query and the root cause of the problem are the prime determinants of the resolution, irrespective of the manner of formulation of the at least one query. The implementation of features of the present disclosure results in achieving better efficiency owing to several factors. In an example, the factors include but are not limited to, faster resolution of queries received from the at least one entity, the capability of resolving queries irrespective of the manner of formulation of query, flexibility in terms of compatibility with the existing software ecosystem of the organization, ensuring enhanced user experience, and the like.

FIG. 1 is an exemplary system for use in accordance with the embodiments described herein. The system 100 is generally shown and may include a computer system 102, which is generally indicated. The term "computer system" may also be referred to as "computing device" and such phrases/terms can be used interchangeably in the specifications.

The computer system 102 may include a set of instructions that can be executed to cause the computer system 102 to perform any one or more of the methods or computer-based functions disclosed herein, either alone or in combination with the other described devices. The computer system 102 may operate as a standalone device or may be connected to other systems or peripheral devices. For example, the computer system 102 may include, or be included within, any one or more computers, servers, systems, communication networks or cloud-based environment. Even further, the instructions may be operative in such a cloud-based computing environment.

In a networked deployment, the computer system 102 may operate in the capacity of a server or as a client-user computer in a server-client user network environment, a client-user computer in a cloud-based computing environment, or as a peer computer system in a peer-to-peer (or distributed) network environment. The computer system 102, or portions thereof, may be implemented as, or incorporated into, various devices, such as a personal computer, a virtual desktop computer, a tablet computer, a set-top box, a personal digital assistant, a mobile device, a palmtop computer, a laptop computer, a desktop computer, a communications device, a wireless smartphone, a personal trusted device, a wearable device, a global positioning satellite (GPS) device, a web appliance, or any other machine capable of executing a set of instructions (sequential or otherwise) that specify actions to be taken by that machine. Further, while a single computer system 102 is illustrated, additional embodiments may include any collection of systems or sub-systems that individually or jointly execute instructions or perform functions. The term "system" shall be taken throughout the present disclosure to include any collection of systems or sub-systems that individually or jointly execute a set, or multiple sets, of instructions to perform one or more computer functions.

As used herein, at least one query corresponds to at least one from among a text-based query, an audio-based query, and a screen-shot-based query received from at least one entity for the resolution and technical support. The at least one query received from the at least one entity may also be termed as a "ticket" raised by the at least one entity for technical support.

As used herein, the database includes the records of the data associated with the resolution of the plurality of queries, and the feedback received from the at least one entity on the plurality of queries and their corresponding resolutions provided to the at least one entity for the at least one query.

As used herein, the parameters associated with the plurality of queries include but are not limited to the root cause of the query, the content of the query, the context of the query, the associated resolution of the query, the response of the at least one entity to the recommended resolution to similar queries raised in the past, and the like.

As illustrated in FIG. 1, the computer system 102 may include at least one processor 104. Processor 104 is tangible and non-transitory. As used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. Processor 104 is an article of manufacture and/or a machine component. The processor 104 is configured to execute software instructions in order to perform functions as described in the various embodiments herein. The processor 104 may be a general-purpose processor or may be part of an application-specific integrated circuit (ASIC). The processor 104 may also be a microprocessor, a microcomputer, a processor chip, a controller, a microcontroller, a digital signal processor (DSP), a state machine, or a programmable logic device. The processor 104 may also be a logical circuit, including a programmable gate array (PGA) such as a field programmable gate array (FPGA), or another type of circuit that includes discrete gate and/or transistor logic. The processor 104 may be a central processing unit (CPU), a graphics processing unit (GPU), or both. Additionally, any processor described herein may include multiple processors, parallel processors, or both. Multiple processors may be included in or coupled to, a single device or multiple devices.

The computer system 102 may also include a computer memory 106. The computer memory 106 may include a static memory, a dynamic memory, or both in communication. Memories described herein are tangible storage mediums that can store data and executable instructions, and are non-transitory during the time instructions are stored therein. Again, as used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The memories are an article of manufacture and/or machine component. Memories described herein are computer-readable storage mediums from which data and executable instructions can be read by a computer. Memories, as described herein, may be random access memory (RAM), read-only memory (ROM), flash memory, electrically programmable read-only memory (EPROM), electrically erasable programmable read-only memory (EEPROM), registers, a hard disk, a cache, a removable disk, tape, compact disk read-only memory (CD-ROM), digital versatile disk (DVD), floppy disk, Blu-ray disk, or any other form of storage medium known in the art. Memories may be volatile or non-volatile, secure and/or encrypted, unsecure and/or unencrypted. As regards the present disclosure, the computer memory 106 may comprise any combination of memories or a single storage.

The computer system 102 may further include a Display 108, such as a liquid crystal display (LCD), an organic light emitting diode (OLED), a flat panel display, a solid-state display, a cathode ray tube (CRT), a plasma display, or any other type of display, examples of which are well known to skilled persons.

The computer system 102 may also include at least one input device 110, such as a keyboard, a touch-sensitive input screen or pad, a speech input, a mouse, a remote-control device having a wireless keypad, a microphone coupled to a speech recognition engine, a camera such as a video camera or still camera, a cursor control device, a global positioning system (GPS) device, an altimeter, a gyroscope, an accelerometer, a proximity sensor, or any combination thereof. Those skilled in the art appreciate that various embodiments of the computer system 102 may include multiple input devices 110. Moreover, those skilled in the art further appreciate that the above-listed, exemplary input devices 110 are not meant to be exhaustive and that the computer system 102 may include any additional, or alternative, input devices 110.

The computer system 102 may also include a medium reader 112 which is configured to read any one or more sets of instructions, e.g., software, from any of the memories described herein. The instructions, when executed by a processor, can be used to perform one or more of the methods and processes as described herein. In a particular embodiment, the instructions may reside completely, or at least partially, within the memory 106, the medium reader 112, and/or the processor 110 during execution by the computer system 102.

Furthermore, the computer system 102 may include any additional devices, components, parts, peripherals, hardware, software, or any combination thereof which are commonly known and understood as being included with or within a computer system, such as but not limited to, a network interface 114 and an output device 116. The output device 116 may be, but is not limited to, a speaker, an audio out, a video out, a remote-control output, a printer, or any combination thereof. Additionally, the term "Network interface" may also be referred to as "Communication interface" and such phrases/terms can be used interchangeably in the specifications.

Each of the components of the computer system 102 may be interconnected and communicate via a bus 118 or other communication link. As shown in FIG. 1, the components may each be interconnected and communicate via an internal bus. However, those skilled in the art appreciate that any of the components may also be connected via an expansion bus. Moreover, the bus 118 may enable communication via any standard or other specification commonly known and understood such as, but not limited to, peripheral component interconnect, peripheral component interconnect expresses, parallel advanced technology attachment, serial advanced technology attachment, etc.

The computer system 102 may be in communication with one or more additional computer devices 120 via a network 122. The network 122 may be, but is not limited to, a local area network, a wide area network, the Internet, a telephony network, a short-range network, or any other network commonly known and understood in the art. The short-range network may include, for example, Bluetooth, Zigbee, infrared, near-field communication, ultra-band, or any combination thereof. Those skilled in the art appreciate that additional networks 122 which are known and understood may additionally or alternatively be used and that the exemplary networks 122 are not limiting or exhaustive. Also, while the network 122 is shown in FIG. 1 as a wireless network, those skilled in the art appreciate that the network 122 may also be a wired network.

The additional computer device 120 is shown in FIG. 1 as a personal computer. However, those skilled in the art appreciate that, in alternative embodiments of the present disclosure, the computer device 120 may be a laptop computer, a tablet PC, a personal digital assistant, a mobile device, a palmtop computer, a desktop computer, a communications device, a wireless telephone, a personal trusted device, a web appliance, a server, or any other device that is capable of executing a set of instructions, sequential or otherwise, that specify actions to be taken by that device. Of course, those skilled in the art appreciate that the above-listed devices are merely exemplary devices and that the device 120 may be any additional device or apparatus commonly known and understood in the art without departing from the scope of the present disclosure. For example, the computer device 120 may be the same or similar to the computer system 102. Furthermore, those skilled in the art similarly understand that the device may be any combination of devices and apparatuses.

Of course, those skilled in the art appreciate that the above-listed components of the computer system 102 are merely meant to be exemplary and are not intended to be exhaustive and/or inclusive. Furthermore, the examples of the components listed above are also meant to be exemplary and similarly are not meant to be exhaustive and/or inclusive.

In accordance with various embodiments, the methods described herein may be implemented using a hardware computer system that executes software programs. Further, in an exemplary, non-limited embodiment, implementations can include distributed processing, component/object distributed processing, and parallel processing. Virtual computer system processing can be constructed to implement one or more of the methods or functionalities as described herein, and a processor described herein may be used to support a virtual processing environment.

As described herein, various embodiments disclose methods, and systems for providing the NLP-based virtual assistant for technical support.

Figure 2:
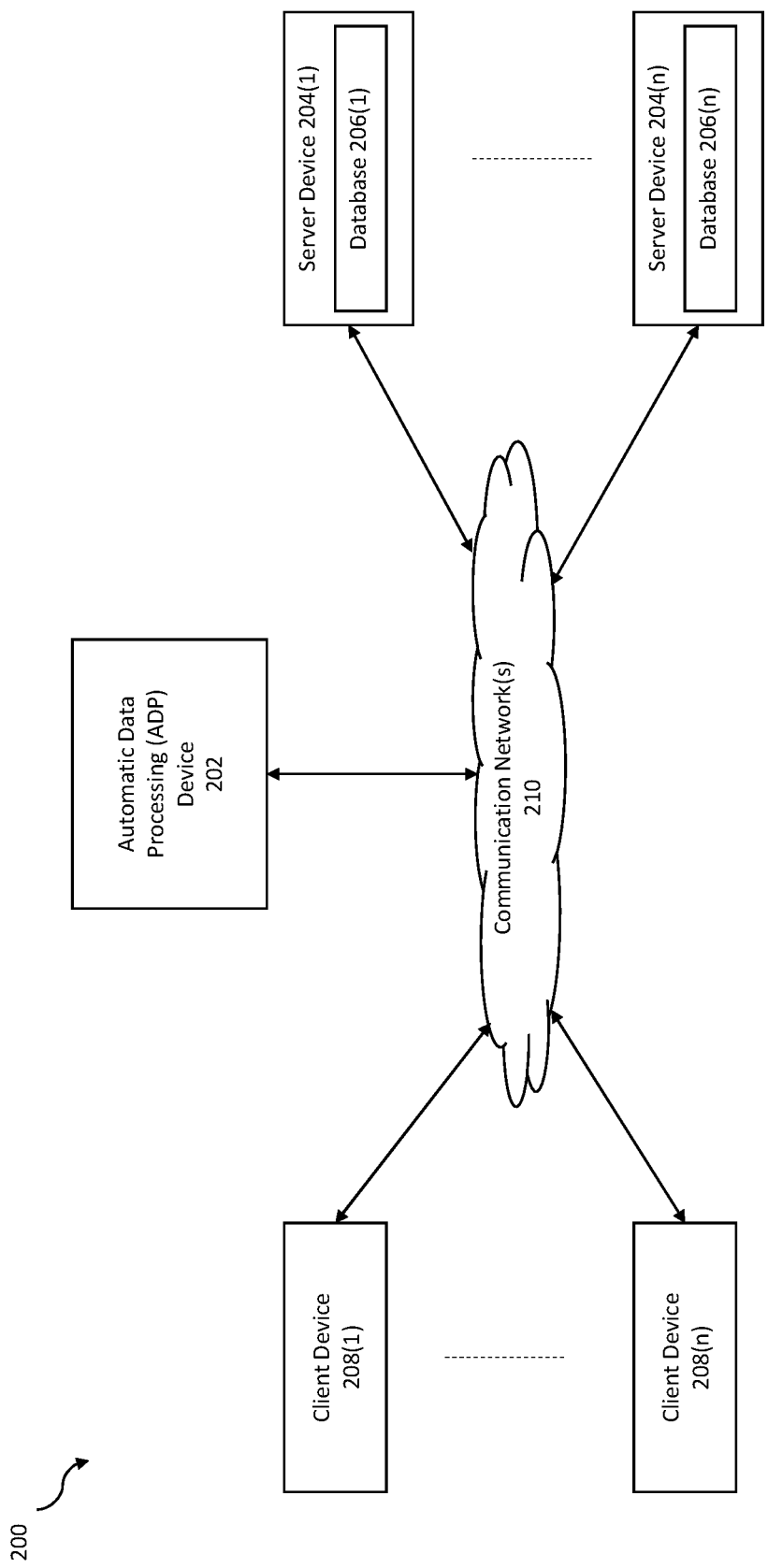
FIG. 2 illustrates an exemplary diagram of a network environment for providing an NLP-based virtual assistant for technical support, in accordance with an exemplary embodiment.

Referring to FIG. 2, a schematic of an exemplary network environment 200 for implementing a method for providing the NLP-based virtual assistant for technical support is illustrated. In an exemplary embodiment, the method is executable on any networked computer platform, such as, for example, a personal computer (PC).

The method for providing an NLP-based virtual assistant for technical support may be implemented by an Automatic Data Processing (ADP) device 202. The ADP device 202 may be the same or similar to the computer system 102 as described with respect to FIG. 1. The ADP device 202 may store one or more applications that can include executable instructions that, when executed by the ADP device 202, cause the ADP device 202 to perform desired actions, such as to transmit, receive, or otherwise process network messages, for example, and to perform other actions described and illustrated below with reference to the figures. The application(s) may be implemented as modules or components of other applications. Further, the application(s) can be implemented as operating system extensions, modules, plugins, or the like.

In a non-limiting example, the application(s) may be operative in a cloud-based computing environment. The application(s) may be executed within or as a virtual machine(s) or virtual server(s) that may be managed in a cloud-based computing environment. Also, the application(s), and even the ADP device 202 itself, may be located in the virtual server(s) running in a cloud-based computing environment rather than being tied to one or more specific physical network computing devices. Also, the application(s) may be running in one or more virtual machines (VMs) executing on the ADP device 202. Additionally, in one or more embodiments of this technology, virtual machine(s) running on the ADP device 202 may be managed or supervised by a hypervisor.

In the network environment 200 of FIG. 2, the ADP device 202 is coupled to a plurality of server devices 204(1)-204(n) that hosts a plurality of databases 206(1)-206(n), and also to a plurality of client devices 208(1)-208(n) via communication network(s) 210. A communication interface of the ADP device 202, such as the network interface 114 of the computer system 102 of FIG. 1, operatively couples and communicates between the ADP device 202, the server devices 204(1)-204(n), and/or the client devices 208(1)-208(n), which are all coupled together by the communication network(s) 210, although other types and/or numbers of communication networks or systems with other types and/or numbers of connections and/or configurations to other devices and/or elements may also be used.

The communication network(s) 210 may be the same or similar to the network 122 as described with respect to FIG. 1, although the ADP device 202, the server devices 204(1)-204(n), and/or the client devices 208(1)-208(n) may be coupled together via other topologies. Additionally, the network environment 200 may include other network devices such as one or more routers and/or switches, for example, which are well known in the art and thus will not be described herein. This technology provides a number of advantages including methods, non-transitory computer-readable storage media, and ADP devices that efficiently implement the method for providing the NLP-based virtual assistant for the technical support based on at least one keywords associated with the at least one query received from the at least one entity.

By way of example only, the communication network(s) 210 may include local area network(s) (LAN(s)) or wide area network(s) (WAN(s)), and can use TCP/IP over Ethernet and industry-standard protocols, although other types and/or numbers of protocols and/or communication networks may be used. The communication network(s) 210 in this example may employ any suitable interface mechanisms and network communication technologies including, for example, teletraffic in any suitable form (e.g., voice, modem, and the like), Public Switched Telephone Networks (PSTNs), Ethernet-based Packet Data Networks (PDNs), combinations thereof, and the like.

The ADP device 202 may be a standalone device or integrated with one or more other devices or apparatuses, such as one or more of the server devices 204(1)-204(n), for example. In one particular example, the ADP device 202 may include or be hosted by one of the server devices 204(1)-204(n), and other arrangements are also possible. Moreover, one or more of the devices of the ADP device 202 may be in the same or a different communication network including one or more public, private, or cloud-based networks, for example.

The plurality of server devices 204(1)-204(n) may be the same or similar to the computer system 102 or the computer device 120 as described with respect to FIG. 1, including any features or combination of features described with respect thereto. For example, any of the server devices 204(1)-204(n) may include, among other features, one or more processors, a memory, and a communication interface, which are coupled together by a bus or other communication link, although other numbers and/or types of network devices may be used. In an example, the server devices 204(1)-204(n) may process requests received from the ADP device 202 via the communication network(s) 210 according to the HTTP-based and/or JavaScript Object Notation (JSON) protocol, for example, although other protocols may also be used.

The server devices 204(1)-204(n) may be hardware or software or may represent a system with multiple servers in a pool, which may include internal or external networks. The server devices 204(1)-204(n) hosts the databases 206(1)-206(n) that are configured to store data that relates to the content of the at least one query, the identified root cause of the at least one query, the context of the at least one query and the resolution associated with the at least one query.

Although the server devices 204(1)-204(n) are illustrated as single devices, one or more actions of each of the server devices 204(1)-204(n) may be distributed across one or more distinct network computing devices that together comprise one or more of the server devices 204(1)-204(n). Moreover, the server devices 204(1)-204(n) is not limited to a particular configuration. Thus, the server devices 204(1)-204(n) may contain a plurality of network computing devices that operate using a controller/agent approach, whereby one of the network computing devices of the server devices 204(1)-204(n) operates to manage and/or otherwise coordinate operations of the other network computing devices.

The server devices 204(1)-204(n) may operate as a plurality of network computing devices within a cluster architecture, a peer-to-peer architecture, virtual machines, or within a cloud-based architecture, for example. Thus, the technology disclosed herein is not to be construed as being limited to a single environment and other configurations and architectures are also envisaged.

The plurality of client devices 208(1)-208(n) may also be the same or similar to the computer system 102 or the computer device 120 as described with respect to FIG. 1, including any features or combination of features described with respect thereto. For example, the client devices 208(1)-208(n) in this example may include any type of computing device that can interact with the ADP device 202 via a communication network(s) 210. Accordingly, the client devices 208(1)-208(n) may be mobile computing devices, desktop computing devices, laptop computing devices, tablet computing devices, or the like, that host chat, e-mail, or voice-to-text applications, for example. In an exemplary embodiment, at least one client device 208 is a wireless mobile communication device, e.g., a smartphone.

The client devices 208(1)-208(n) may run interface applications, such as standard web browsers or standalone client applications, which may provide an interface to communicate with the ADP device 202 via the communication network(s) 210 to communicate user requests and information. The client devices 208(1)-208(n) may further include, among other features, a display device, such as a display screen or touchscreen, and/or an input device, such as a keyboard.

Although the exemplary network environment 200 with the ADP device 202, the server devices 204(1)-204(n), the client devices 208(1)-208(n), and the communication network(s) 210 are described and illustrated herein, other types and/or numbers of systems, devices, components, and/or elements in other topologies may be used. It is to be understood that the systems of the examples described herein are for exemplary purposes, as many variations of the specific hardware and software used to implement the examples are possible, as will be appreciated by those skilled in the relevant art(s).

One or more of the devices depicted in the network environment 200, such as the ADP device 202, the server devices 204(1)-204(n), or the client devices 208(1)-208(n), for example, may be configured to operate as virtual instances on the same physical machine. In other words, one or more of the ADP devices 202, the server devices 204(1)-204(n), or the client devices 208(1)-208(n) may operate on the same physical device rather than as separate devices communicating through communication network(s) 210. Additionally, there may be more or fewer ADP devices 202, server devices 204(1)-204(n), or client devices 208(1)-208(n) than illustrated in FIG. 2.

In addition, two or more computing systems or devices may be substituted for any one of the systems or devices in any example. Accordingly, principles and advantages of distributed processing, such as redundancy and replication, also may be implemented, as desired, to increase the robustness and performance of the devices and systems of the examples. The examples may also be implemented on computer system(s) that extend across any suitable network using any suitable interface mechanisms and traffic technologies, including by way of example only teletraffic in any suitable form (e.g., voice and modem), wireless traffic networks, cellular traffic networks, Packet Data Networks (PDNs), the Internet, intranets, and combinations thereof.

Figure 3:
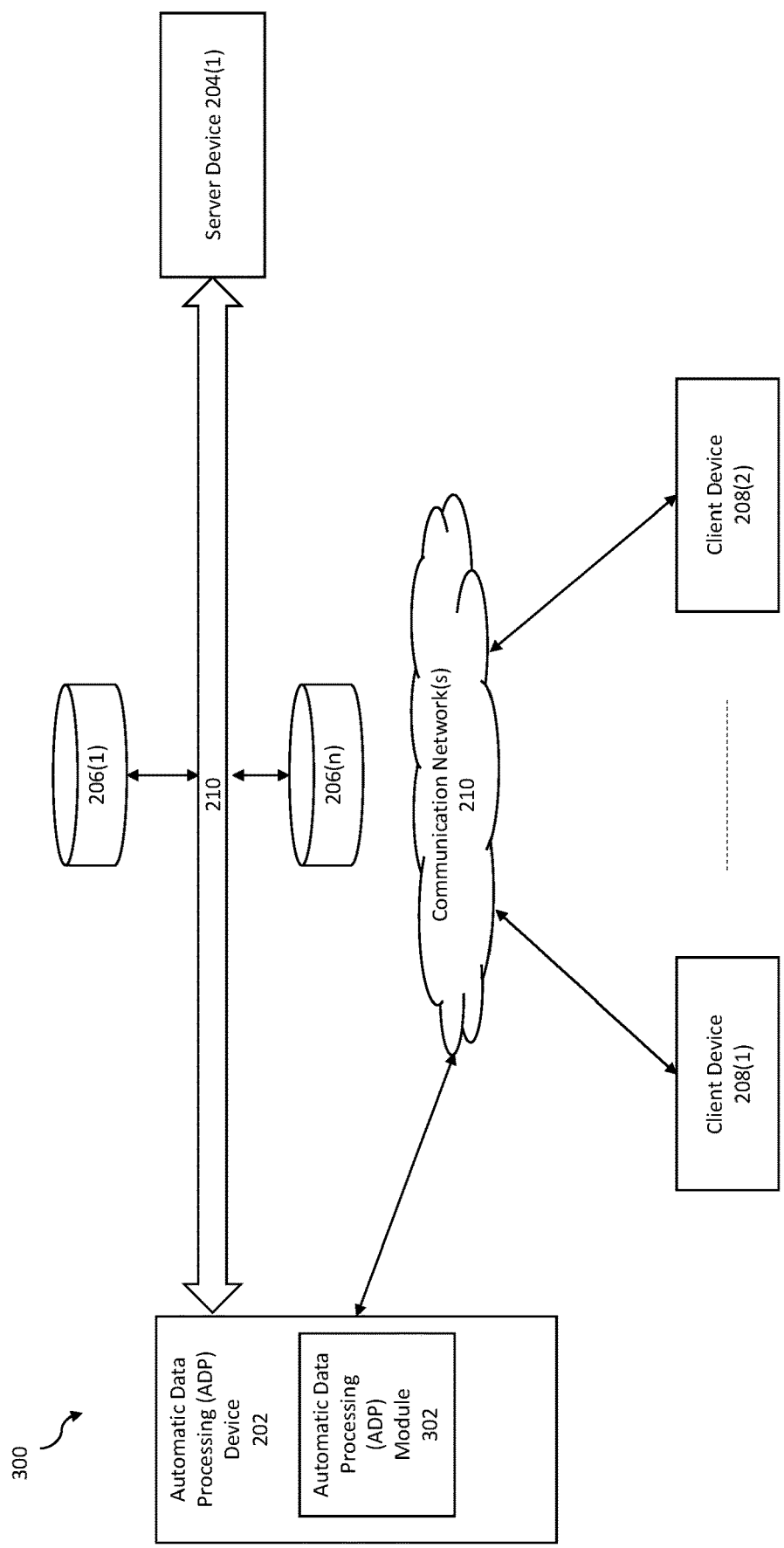
FIG. 3 illustrates an exemplary system for providing an NLP-based virtual assistant for technical support, in accordance with an exemplary embodiment.

FIG. 3 illustrates an exemplary system for implementing a method for providing an NLP-based virtual assistant for technical support in accordance with an exemplary embodiment. As illustrated in FIG. 3, according to exemplary embodiments, the system 300 may comprise an ADP device 202 including an Automatic Data Processing (ADP) module 302 that may be connected to a server device 204(1) and one or more repository 206(1) . . . 206(n) via a communication network 210, but the present disclosure is not limited thereto.

The ADP device 202 is described and shown in FIG. 3 as including the ADP module 302, although it may include other rules, policies, modules, databases, or applications, for example. As will be described below, the ADP module 302 is configured to implement the method for providing the NLP-based virtual assistant for the technical support.

An exemplary process 300 for implementing a method for providing the NLP-based virtual assistant for the technical support utilizing the network environment of FIG. 2 is shown as being executed in FIG. 3. Specifically, the first client device 208(1) and a second client device 208(2) are illustrated as being in communication with ADP device 202. In this regard, the first client device 208(1) and the second client device 208(2) may be "clients" of the ADP device 202 and are described herein as such. Nevertheless, it is to be known and understood that the first client device 208(1) and/or the second client device 208(2) need not necessarily be "clients" of the ADP device 202, or any entity described in association therewith herein. Any additional or alternative relationship may exist between either or both of the first client device 208(1) and the second client device 208(2) and the ADP device 202, or no relationship may exist.

Further, ADP device 202 is illustrated as being able to access one or more repositories 206(1) . . . 206(n). The ADP module 302 may be configured to access these repositories/databases for implementing the method for providing the NLP-based virtual assistant for technical support.

The first client device 208(1) may be, for example, a smartphone. Of course, the first client device 208(1) may be any additional device described herein. The second client device 208(2) may be, for example, a personal computer (PC). Of course, the second client device 208(2) may also be any additional device described herein.

The process may be executed via the communication network(s) 210, which may comprise plural networks as described above. For example, in an exemplary embodiment, either or both of the first client device 208(1) and the second client device 208(2) may communicate with the ADP device 202 via broadband or cellular communication. Of course, these embodiments are merely exemplary and are not limiting or exhaustive.

Figure 4:
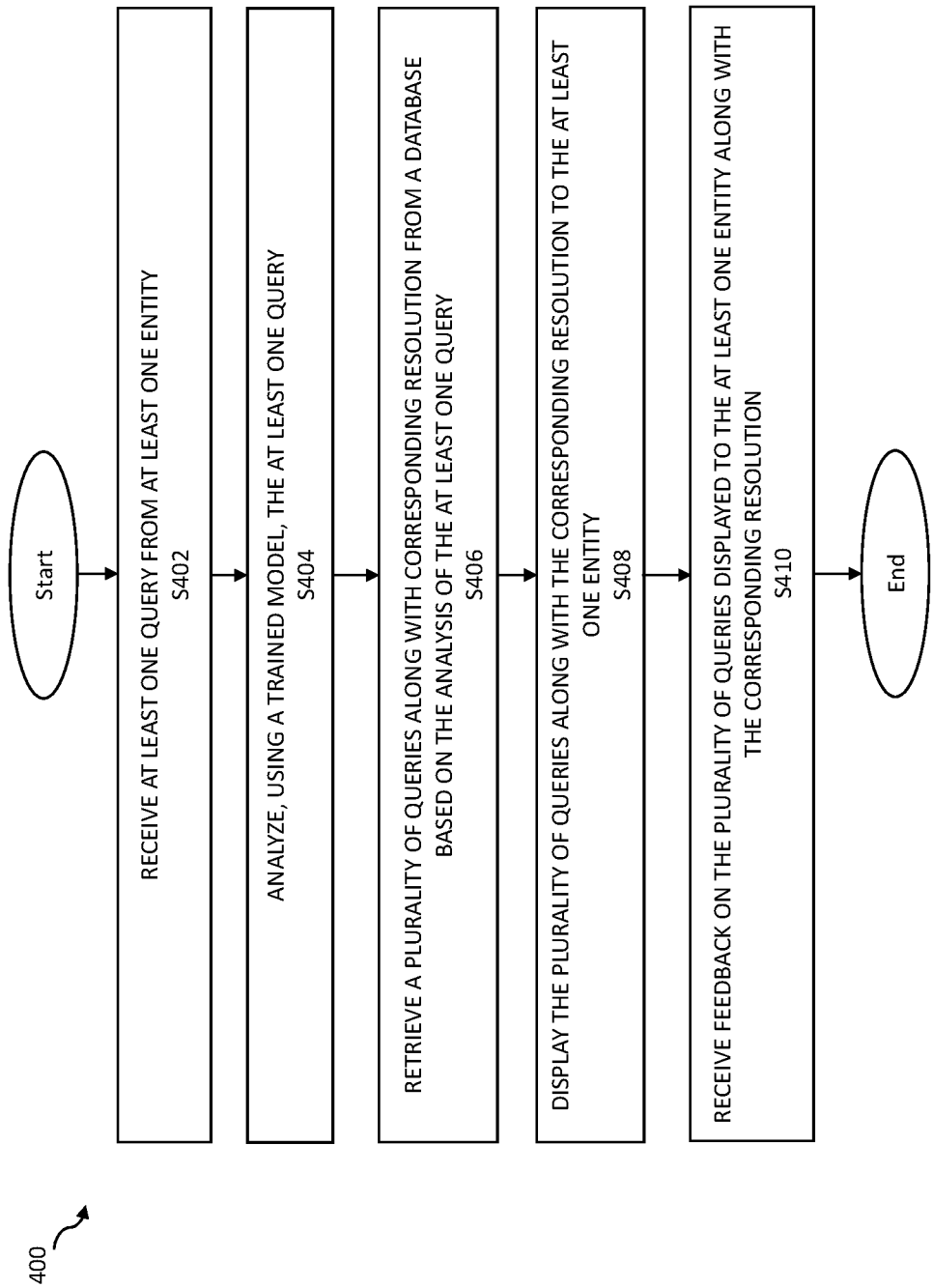
FIG. 4 illustrates an exemplary method flow diagram for providing an NLP-based virtual assistant for technical support, in accordance with an exemplary embodiment.

Referring to FIG. 4, an exemplary method 400 is shown for providing an NLP-based virtual assistant for technical support in accordance with an exemplary embodiment. As shown in FIG. 4, the method begins following a need for technical support for the resolution of the query.

At step S402, the method includes receiving, by the at least one processor 104 via a communication interface 114, at least one query from at least one entity. In an exemplary embodiment, the at least one query corresponds to at least one from among a text-based query, an audio-based query, and a screenshot-based query. In an example, the content of the screenshot-based query is extracted to make the interface user-friendly and to avoid the limitation in terms of the manner in which the at least one query may be received from the at least one entity. The at least one entity may include but is not limited to a user, an employee, a member of the developer team, a member of the production support team, an automated query handling platform, and the like. In an example, the user may raise the at least one query using at least one input device 110, such as a keyboard, a touch-sensitive input screen or pad, a speech input, a mouse, a remote-control device having a wireless keypad, a microphone coupled to a speech recognition engine, a camera such as a video camera or still camera.

At step S404, the method includes analyzing, by the at least one processor 104 using a trained model, the at least one query. In an exemplary embodiment, the analysis of the of the at least one query includes interpreting, by the at least one processor 104, a context associated with the at least one query and identifying, by the at least one processor 104, a root cause associated with the at least one query. In an example, the identified root cause and the context of the at least one query are stored in a database for future reference and to facilitate further learning of the trained model.

At step S406, the method includes retrieving, by the at least one processor 104, a plurality of queries along with corresponding resolution from the database based on the analysis of the at least one query. In an exemplary embodiment, the database includes data associated with the resolution of the plurality of queries. The trained model corresponds to an ML-based model and relies upon SBERT and STS machine learning algorithms. The trained model may include supervised learning algorithms such as, for example, k-method analysis, regression analysis, decision tree analysis, random forest analysis, k-nearest neighbor's analysis, logistic regression analysis, k-fold cross-validation analysis, balanced class weight analysis, and the like. In an embodiment, retrieving the plurality of queries and the corresponding resolution from the database involves identifying, by the at least one processor 104, the plurality of queries and the corresponding resolution from the database, wherein the plurality of queries is identified based on a matching of parameters of the at least one query with parameters of the plurality of the queries. The parameters of the at least one query received from the at least one entity are matched with parameters of the plurality of queries stored in the database to ensure retrieval and recommendation of the relevant queries to the at least one entity. Next, the plurality of queries is ranked using the trained model. The ranking of the plurality of queries is facilitated by using STS based machine learning algorithm. Thereafter, the plurality of queries along with the corresponding resolution is recommended to the at least one entity.

At step S408, the method includes displaying, by the at least one processor 104 via a display 108, the plurality of queries along with the corresponding resolution to the at least one entity. The plurality of retrieved queries is displayed according to the rank of each query of the plurality of queries by the trained model and the corresponding resolutions are also provided to the at least one entity.

At step S410, the method includes receiving, by the at least one processor 104 via the communication interface 114, feedback on the plurality of queries displayed to the at least one entity along with the corresponding resolution. The at least one entity may provide feedback on the recommended plurality of queries and the corresponding resolutions based on a satisfaction level associated with the resolution of the at least one query. The feedback received from the at least one entity may be further stored in the database for improvement and learning of the trained model. The trained model is further capable of incorporating the feedback received from the at least one entity on the resolutions recommended to the at least one query and the relative ranking of the recommended resolutions. The further training of the trained model based on the feedback received from the at least one entity enhances the accuracy of the retrieved resolutions and the experience of the at least one entity with the virtual assistant.

Figure 5:
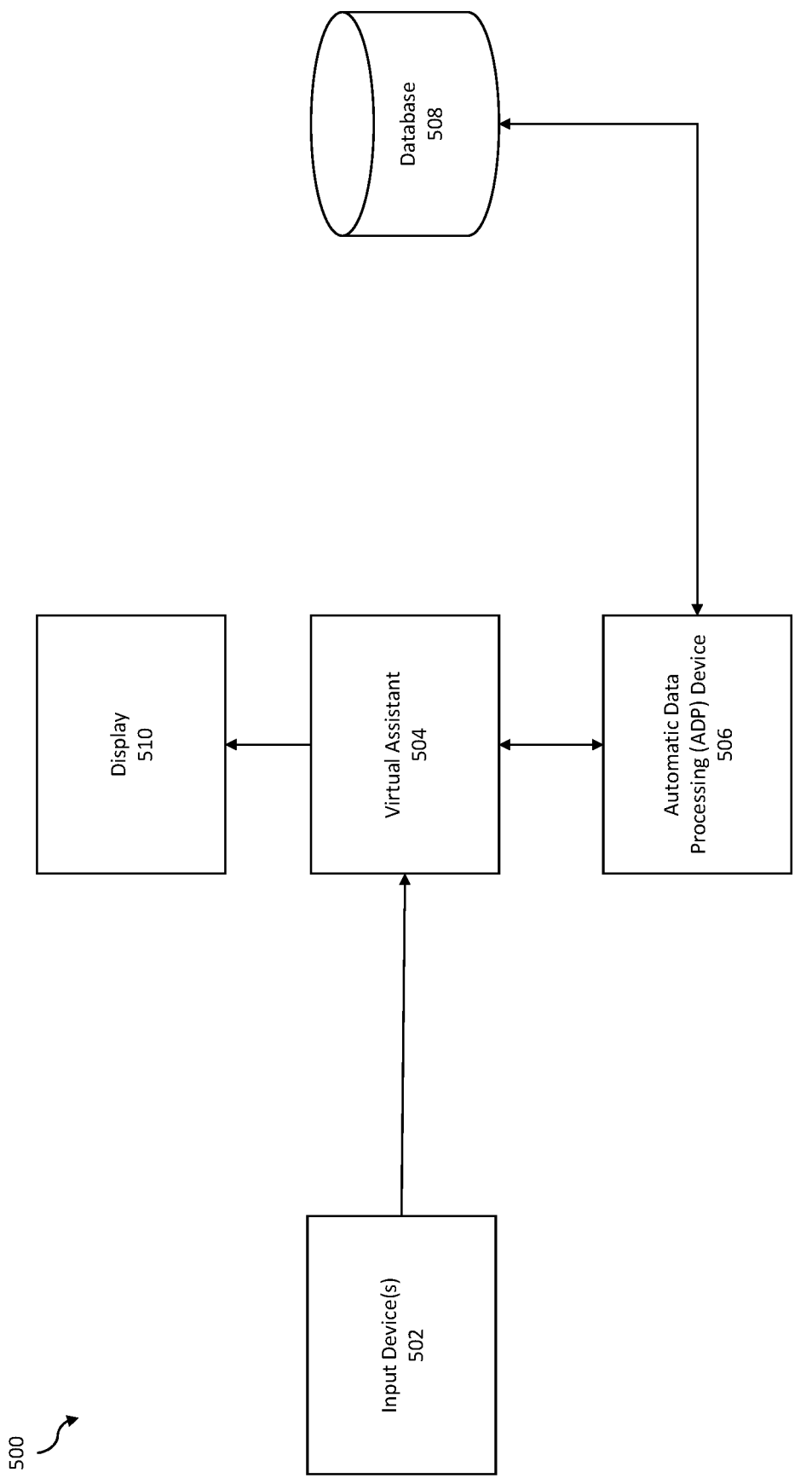
FIG. 5 illustrates a process flow diagram for implementing a method for providing an NLP-based virtual assistant for technical support, in accordance with an exemplary embodiment.

FIG. 5 illustrates a process flow for implementing a method for providing an NLP-based virtual assistant for technical support in accordance with an exemplary embodiment. As illustrated in FIG. 5, the process flow 500 begins with an input of at least one query from the at least one entity such as user or an employee of the organization using input device(s) 502. Further, the at least one query received from the at least one entity is handled by the Virtual Assistant 504. The virtual assistant utilizes the capabilities of Automatic Data Processing (ADP) device 506 for assisting the at least one entity and resolving technical problems reported by the at least one entity in the form of at least one query. The ADP device 506 includes an ML-based model. The ADP device relies upon SBERT and STS machine learning algorithms for handling the at least one query received from the at least one entity. The use of ML algorithms enables the ADP device to have NLP and NLU capabilities. The ADP device 506 analyses the at least one query to identify a context and a root cause associated with the at least one query received from the at least one entity. The ADP device is further capable of retrieving a plurality of similar queries from the database 508 and the corresponding resolution associated with the plurality of queries. The similarity of the plurality of queries identified by the ADP device 506 is based on the parameters like context, root cause, and semantic textual similarity of the at least one query received from the at least one entity with the parameters of the plurality of queries stored in the database 508. The entries and records in the database 508 are updated by the ADP device 506 based on the feedback received from the at least one entity on the retrieved and recommended resolutions. The ADP device 506 ranks the retrieved results and resolutions based on relevance and similarity to the at least one query received from the at least one entity. The updated records in database 508 ensure better accuracy of recommended resolutions to the at least one entity in the future and, thereby enhance the utility of the virtual assistant and the experience of the at least one entity. The plurality of queries along with the corresponding resolutions is displayed to the user via a display 510. The virtual assistant is capable of receiving feedback from the at least one entity on the recommended resolutions. The feedback is again handled by the ADP device 506 to accurately recommend resolutions to at least one query received from the at least one entity. The feedback is also relevant in updating the entries of the database 508 and further training of the ML-based model of the ADP device 506.

In an exemplary embodiment, the Virtual Assistant 504 is configured to automatically extract additional context required for a quick resolution of the at least one query based on a login activity of the at least one entity. The additional content may include but is not limited to information associated with a Continuous Integration (CI) and Continuous Deployment (CD) pipeline, deployment tools, recently created or resolved at least one query, and the like. The configuration of the virtual assistant provides quicker resolutions to the at least one query without the need to ask for additional inputs associated with the context of the at least one query.

In an example, a screenshot-based query that relates to Application A is received from a user to get the virtual assistant on the query. The context and the root cause of the query are diagnosed using a trained model that relies upon SBERT and STS machine learning algorithms. The user is recommended with at least one resolution by the virtual assistant based on queries resolved in the past and stored in the database. The recommendations are displayed according to the rank assigned by the trained model based on the similarity of context, content, and the underlying root cause of the recommended resolutions with the screenshot-based query received from the user.

Accordingly, with this technology, a method and system for providing an NLP-based virtual assistant for technical support are disclosed. As evident from the above disclosure, the present solution provides significant technical advancement over existing solutions by ensuring faster resolution of queries raised by the at least one entity such as employees of the organization. Repetitive and similar queries received from the at least one entity is resolved based on the resolutions provided for the plurality of queries by the technical support team and virtual assistant as disclosed herein, in the past. The use of ML algorithms like SBERT and STS ensures accurate identification of the context and root cause of the at least one query received from the at least one entity. The above-mentioned ML algorithms also provide the most relevant and similar resolutions and accurately rank the recommended resolutions. Therefore, as disclosed, the system achieves better efficiency owing to factors like the faster resolution of the at least one query received from the at least one entity, the virtual assistant's capability to handle the at least one query irrespective of the manner of formulation of the query, flexibility in terms of compatibility with the existing software ecosystem of the organization, enhancing the user experience, avoiding Service Level Agreement misses and the like.

Although the invention has been described with reference to several exemplary embodiments, it is understood that the words that have been used are words of description and illustration, rather than words of limitation. Changes may be made within the purview of the appended claims, as presently stated and as amended, without departing from the scope and spirit of the present disclosure in its aspects. Although the invention has been described with reference to particular means, materials, and embodiments, the invention is not intended to be limited to the particulars disclosed; rather the invention extends to all functionally equivalent structures, methods, and uses such as are within the scope of the appended claims.

For example, while the computer-readable storage medium may be described as a single medium, the term "computer-readable storage medium" includes a single medium or multiple media, such as a centralized or distributed database, and/or associated caches and servers that store one or more sets of instructions. The terms "computer-readable medium" and "computer-readable storage medium" shall also include any medium that is capable of storing, encoding, or carrying a set of instructions for execution by a processor or that causes a computer system to perform any one or more of the embodiments disclosed herein.

The computer-readable storage medium may comprise a non-transitory computer-readable storage medium or media and/or comprise a transitory computer-readable storage medium or media. In a particular non-limiting, exemplary embodiment, the computer-readable storage medium can include a solid-state memory such as a memory card or other package that houses one or more non-volatile read-only memories. Further, the computer-readable storage medium can be a random-access memory or other volatile re-writable memory. Additionally, the computer-readable storage medium can include a magneto-optical or optical medium, such as a disk or tape, or other storage device to capture carrier wave signals such as a signal communicated over a transmission medium. Accordingly, the present disclosure is considered to include any computer-readable storage medium or other equivalents and successor media, in which data or instructions may be stored.

Although the present application describes specific embodiments which may be implemented as computer programs or code segments in computer-readable storage media, it is to be understood that dedicated hardware implementations, such as application-specific integrated circuits, programmable logic arrays, and other hardware devices, can be constructed to implement one or more of the embodiments described herein. Applications that may include the various embodiments set forth herein may broadly include a variety of electronic and computer systems. Accordingly, the present application may encompass software, firmware, and hardware implementations, or combinations thereof. Nothing in the present application should be interpreted as being implemented or implementable solely with software and not hardware.

According to an aspect of the present disclosure, a non-transitory computer-readable storage medium storing instructions for providing an NLP-based virtual assistant for technical support is disclosed. The storage medium includes executable code which, when executed by a processor, may cause the processor to receive, via a communication interface, at least one query from at least one entity. Further, the at least one query corresponds to at least one from among a text-based query, an audio-based query, and a screenshot-based query. Next, the processor may be configured to analyze, using a trained model, the at least one query. Further, to analyze the at least one query, the processor may be configured to interpret a context associated with the at least one query; and identify a root cause associated with the at least one query. Next, the processor may be configured to retrieve, from a database, a plurality of queries along with corresponding resolutions based on the analysis of the at least one query. Further, to retrieve the plurality of queries and the corresponding resolution from the database, the processor is configured to identify the plurality of queries and the corresponding resolution from the database, wherein the plurality of queries is identified based on a matching of parameters of the at least one received query with parameters of the plurality of queries; rank the plurality of queries using the trained model; and recommend the plurality of queries along with the corresponding resolution to the at least one entity based on the rank of each query of the plurality of queries. Next, the processor may be configured to display the plurality of queries along with the corresponding resolution to the at least one entity. Thereafter, the processor may be configured to receive, via the communication interface, feedback on the plurality of queries displayed to the at least one entity along with the corresponding resolution.

In an embodiment of the present disclosure, the database includes data associated with the resolution of the plurality of queries, and the feedback received, from the at least one entity, on the plurality of queries displayed along with the corresponding resolution.

Although the present specification describes components and functions that may be implemented in particular embodiments with reference to particular standards and protocols, the present disclosure is not limited to such standards and protocols. Such standards are periodically superseded by faster or more efficient equivalents having essentially the same functions. Accordingly, replacement standards and protocols having the same or similar functions are considered equivalents thereof.

The illustrations of the embodiments described herein are intended to enable a general understanding of the various embodiments. The illustrations are not intended to serve as a complete description of all of the elements and features of apparatus and systems that utilize the structures or methods described herein. Many other embodiments may be apparent to those of skill in the art upon reviewing the present disclosure. Other embodiments may be utilized and derived from the present disclosure, such that structural and logical substitutions and changes may be made without departing from the scope of the present disclosure. Additionally, the illustrations are merely representational and may not be drawn to scale. Certain proportions within the illustrations may be exaggerated, while other proportions may be minimized. Accordingly, the present disclosure and the figures are to be regarded as illustrative rather than restrictive.

One or more embodiments of the present disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the present disclosure is submitted with the understanding that it will not be used to interpret or limit the scope or meaning of the claims. In addition, in the foregoing Detailed Description, various features may be grouped together or described in a single embodiment for the purpose of streamlining the present disclosure. This disclosure is not to be interpreted as reflecting an intention that the claimed embodiments require more features than are expressly recited in each claim. Rather, as the following claims reflect, the inventive subject matter may be directed to less than all of the features of any of the disclosed embodiments. Thus, the following claims are incorporated into the Detailed Description, with each claim standing on its own as defining separately claimed subject matter.

The above-disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A method for providing a natural language processing based virtual assistant for a technical support, the method being implemented by at least one processor, the method comprising:
    receiving, by the at least one processor via a communication interface, at least one query from at least one entity;
    analyzing, by the at least one processor using a trained model, the at least one query;
    retrieving, by the at least one processor from a database, a plurality of queries along with a corresponding resolution based on the analysis of the at least one query;
    displaying, by the at least one processor via a display, the plurality of queries along with the corresponding resolution to the at least one entity; and
    receiving, by the at least one processor via the communication interface, feedback on the plurality of queries displayed to the at least one entity along with the corresponding resolution,
    wherein the retrieving the plurality of queries and the corresponding resolution from the database comprises:
    identifying, by the least one processor, the plurality of queries and the corresponding resolution from the database, wherein the plurality of queries is identified based on a matching of parameters of the at least one query with parameters of the plurality of queries;
    ranking, by the at least one processor, each respective query of the plurality of queries using the trained model; and
    recommending, by the at least one processor, the plurality of queries along with the corresponding resolution to the at least one entity based on the ranking of each respective query of the plurality of queries.

2. The method as claimed in claim 1, wherein the at least one query corresponds to at least one from among a text-based query, an audio-based query, and a screenshot-based query.

3. The method as claimed in claim 1, wherein the analyzing the at least one query further comprises:
    interpreting, by the at least one processor, a context associated with the at least one query; and
    identifying, by the at least one processor, a root cause associated with the at least one query.

4. The method as claimed in claim 1, wherein the database comprises data associated with the corresponding resolution of the plurality of queries, and the feedback received, from the at least one entity, on the plurality of queries displayed along with the corresponding resolution.

5. A computing device configured to implement an execution of a method for providing a natural language processing based virtual assistant for a technical support, the computing device comprising:
    a processor;
    a memory; and
    a communication interface coupled to each of the processor and the memory,
    wherein the processor is configured to:
    receive, via the communication interface, at least one query from at least one entity;
    analyze, using a trained model, the at least one query;
    retrieve, from a database, a plurality of queries along with a corresponding resolution based on the analysis of the at least one query;
    display, via a display, the plurality of queries along with the corresponding resolution to the at least one entity; and
    receive, via the communication interface, feedback on the plurality of queries displayed to the at least one entity along with the corresponding resolution,
    wherein to retrieve the plurality of queries and the corresponding resolution from the database, the processor is further configured to:
    identify the plurality of queries and the corresponding resolution from the database, wherein the plurality of queries is identified based on a matching of parameters of the at least one query with parameters of the plurality of queries;
    rank each respective query of the plurality of queries using the trained model; and recommend the plurality of queries along with the corresponding resolution to the at least one entity based on the rank of each respective query of the plurality of queries.

6. The computing device as claimed in claim 5, wherein the at least one query corresponds to at least one from among a text-based query, an audio-based query, and a screenshot-based query.

7. The computing device as claimed in claim 5, wherein to analyze the at least one query, the processor is further configured to:
   interpret a context associated with the at least one query; and
   identify a root cause associated with the at least one query.

8. The computing device as claimed in claim 5, wherein the database comprises data associated with the corresponding resolution of the plurality of queries, and the feedback received, from the at least one entity, on the plurality of queries displayed along with the corresponding resolution.

9. A non-transitory computer readable storage medium storing instructions for providing a natural language processing based virtual assistant for a technical support, the instructions comprising executable code which, when executed by a processor, causes the processor to:
   receive, via a communication interface, at least one query from at least one entity;
   analyze, using a trained model, the at least one query;
   retrieve, from a database, a plurality of queries along with a corresponding resolution based on the analysis of the at least one query;
   display, via a display, the plurality of queries along with the corresponding resolution to the at least one entity; and
   receive, via the communication interface, feedback on the plurality of queries displayed to the at least one entity along with the corresponding resolution,
   wherein to retrieve the plurality of queries and the corresponding resolution from the database, when executed by the processor, the executable code further causes the processor to:
   identify the plurality of queries and the corresponding resolution from the database, wherein the plurality of queries is identified based on a matching of parameters of the at least one query with parameters of the plurality of queries;
   rank each respective query of the plurality of queries using the trained model; and
   recommend the plurality of queries along with the corresponding resolution to the at least one entity based on the rank of each respective query of the plurality of queries.

10. The storage medium as claimed in claim 9, wherein the at least one query corresponds to at least one from among a text-based query, an audio-based query, and a screenshot-based query.

11. The storage medium as claimed in claim 9, wherein to analyze the at least one query, when executed by the processor, the executable code further causes the processor to:
   interpret a context associated with the at least one query; and
   identify a root cause associated with the at least one query.

12. The storage medium as claimed in claim 9, wherein the database comprises data associated with the corresponding resolution of the plurality of queries, and the feedback received, from the at least one entity, on the plurality of queries displayed along with the corresponding resolution.

* * * * *